UNITED STATES PATENT OFFICE.

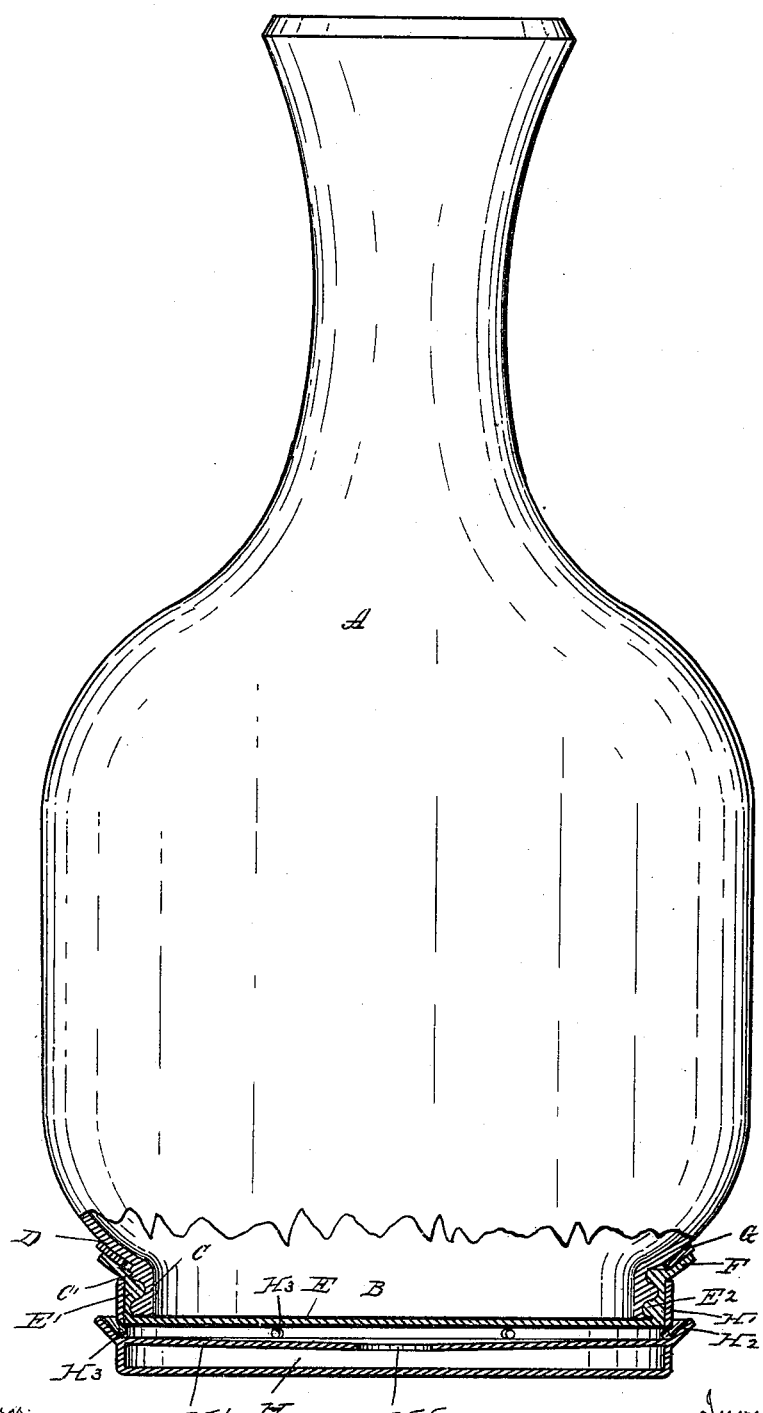

JOHN HURLEY, OF LITTLE FALLS, NEW YORK.

WATER-BOTTLE.

SPECIFICATION forming part of Letters Patent No. 666,313, dated January 22, 1901.

Application filed March 12, 1900. Serial No. 8,253. (No model.)

*To all whom it may concern:*

Be it known that I, JOHN HURLEY, a citizen of the United States, residing at Little Falls, in the county of Herkimer and State of New York, have invented certain new and useful Improvements in Water-Bottles; and I do hereby declare the following to be a full, clear, and exact description of the invention, such as will enable others skilled in the art to which it appertains to make and use the same.

This invention relates to water-bottles and similar vessels, the object thereof being to provide an improved water-bottle in which the interior is rendered accessible for cleaning and which will permit the introduction of ice into the bottle proper. I attain this object by my invention, which consists, essentially, in a bottle having a large central circular opening at its lower end and a detachable cover, which at the same time forms a bottom for the bottle. These and other novel features will be hereinafter more fully described and finally embraced in the clauses of the claim.

The accompanying drawing shows a water-bottle provided with my improvements.

A represents the body or bottle proper, the lower end of which has a large central circular opening B, around which is formed a downwardly-directed rim C, the outer side of which is provided with screw-threads C'. Formed on the under side of the bottle proper is a packing-seat D.

E represents the detachable bottom, which is provided with an upwardly-directed rim E', having interior screw-threads $E^2$, adapted to engage the screw-threads on the rim of the bottle. F represents a beveled flange formed in the upper portion of the said rim of the bottom. Interposed between this flange and the said packing-seat on the bottle is a packing-ring G.

H represents a receptacle adapted to receive the water formed on the outside of the bottle from the sweating of the same. This receptacle is provided with an upwardly-directed rim H', which fits snugly over the rim of the bottom. Formed on the outer side of the receptacle is an upwardly-beveled flange $H^2$, adapted to catch the drops of water as they descend the outer surface of the bottle.

$H^3$ represents a series of perforations cut in the rim of the receptacle in order to permit the water gathered on the flange to flow into the receptacle. Located on the inside of the receptacle is a disk $H^4$, which inclines downwardly toward the center and which is provided with a central opening $H^5$. This disk is adapted to convey the water from the said flange to the lower portion of the receptacle and prevent the water accumulated therein from running out when the bottle is tipped. As this receptacle is held by frictional contact to the rim of the bottom, it may be quickly removed and emptied of its contents. The bottom of the bottle is unscrewed in the ordinary manner and when removed will afford ample access to the interior of the bottle.

The receptacle, as well as the detachable bottom, is preferably made of metal, and the outer rim of the bottom may be roughened or corrugated in order to provide a better grip for the fingers when unscrewing the bottom.

Although I have described my invention as a water-bottle, it is evident that the construction may be used to advantage for other bottles or vessels. Neither do I desire to limit myself to the particular construction herein shown and described, as I am aware that some changes may be made therein without departing from the spirit and scope of my invention.

What I claim as new, and desire to secure by Letters Patent, is—

1. In a water-bottle, the combination with a detachable cover at the base of the bottle, of a detachable drip-cup mounted upon said cover and provided with an interior water-conducting shelf, said shelf having a central perforation and inclined toward the same, substantially as described.

2. A water-bottle provided with a circular opening in its lower end, and a detachable cover mounted upon said opening, combined with a drip-cup, said drip-cup having a vertical wall, the upper portion of which embraces the periphery of the cover and provided with a flange to catch the water in its downward flow, an inclined water-conducting shelf within the cup and a series of perforations in the wall of the cup, substantially as described.

JOHN HURLEY.

Witnesses:
RICHARD HURLEY,
CARL F. MÜLLER.